June 2, 1942.  W. B. WINES  2,285,181
GLASS WORKING MACHINE
Filed Aug. 23, 1940
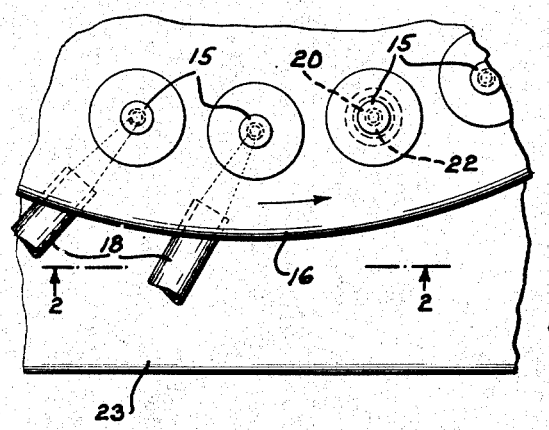
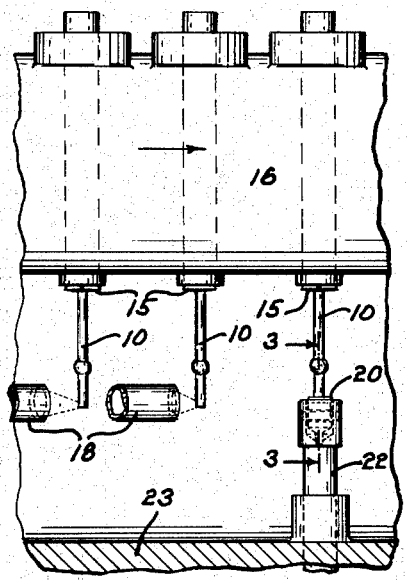
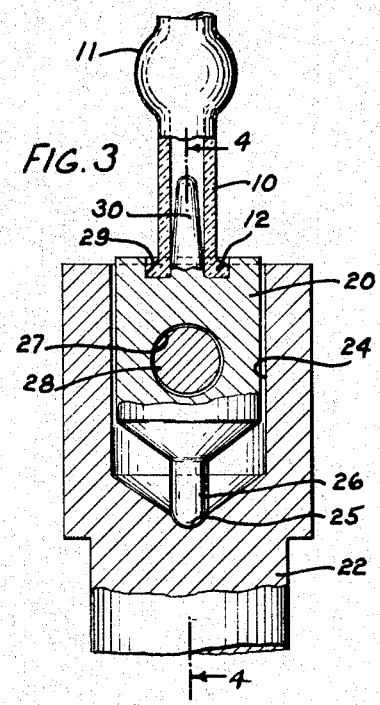
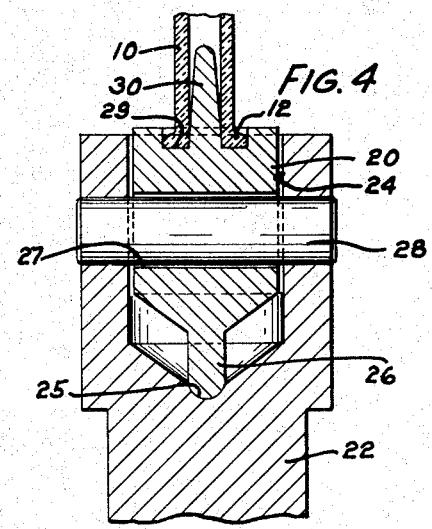
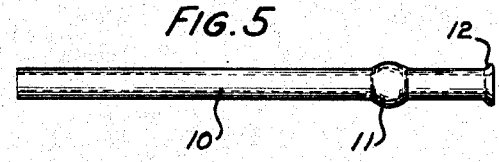
INVENTOR
W. B. WINES
BY Emery Robinson
ATTORNEY Patented June 2, 1942

2,285,181

UNITED STATES PATENT OFFICE 2,285,181

GLASS WORKING MACHINE

William B. Wines, Downers Grove, Ill., assignor to Western Electric Company, Incorporated, New York, N. Y., a corporation of New York Application August 23, 1940, Serial No. 353,849

6 Claims. (Cl. 49—7)

This invention relates to glass working machines, and more particularly to machines for making filament supporting stems for electric lamps.

Objects of the invention are to provide a simple, inexpensive and efficient machine for making glass articles, such as electric lamp filament supporting stems and the like.

In accordance with one embodiment of the invention, there is provided a machine for making electric lamp filament supporting stems from individual lengths of glass tubing, in which an annular series of chucks, each adapted to receive and hold a glass stem tube, are indexed through several heating stations and then to a shaping or molding station, where a shaping member or mold is carried into engagement with a previously softened end portion of the tube to form thereon an external peripheral flange. The mold is freely movable on its carrier and is provided with an elongated centering pin adapted to enter the stem tube, whereby the mold is automatically self-centered with respect to each stem tube indexed to the molding station.

A more complete understanding of the invention may be had from the following detailed description when read in conjunction with the accompanying drawing, in which Fig. 1 is a plan view of a portion of a stem making machine embodying the invention;

Fig. 2 is a fragmentary elevational view thereof, looking in the direction indicated by the arrows on line 2—2 of Fig. 1, Fig. 3 is an enlarged vertical sectional view of the shaping member or mold, taken on line 3—3 of Fig. 2;

Fig. 4 is a fragmentary vertical section taken on line 4—4 of Fig. 3, and

Fig. 5 is an elevational view of a filament supporting stem adapted to be produced by the machine illustrated in Figs. 1 to 4, inclusive.

Although not limited thereto, the invention is herein illustrated and described as embodied in a machine for making filament supporting stems for small incandescent electric lamps of the type disclosed in McBerty et al. Patent No. 709,996. A filament supporting stem of the type referred to is illustrated in Fig. 5. It comprises a glass tube 10 having a spherical enlargement 11 intermediate its ends for sealing it into a lamp bulb in the manner disclosed in the patent referred to. One end of the stem is formed with a peripheral flange 12, and the present invention is directed primarily to that portion of the stem making machine by means for which this flange is formed.

Referring to Figs. 1 and 2, the machine illustrated therein comprises an annular series of work-holding chucks 15, 15 rotatably mounted in suitable bearings near the periphery of a rotary circular carrier or turret 16, only a portion of which is shown. Each of the chucks is adapted to hold the upper end of a vertically positioned glass stem tube 10, suitable means being provided for opening and closing the chucks to insert the glass tubes therein and withdraw the completed stems therefrom. By means of suitable driving mechanism (none shown) the turret 16 is intermittently rotated, whereby the several chucks, each holding a stem tube 10, are advanced step by step, past a series of gas burners 18, 18, adapted to soften the lower end portion of each of the stem tubes. The stem tubes are then indexed, one at a time, to a shaping or molding station, where a shaping member or mold 20 is elevated into engagement with the softened lower end of each stem tube. This mold is carried at the upper end of a vertically reciprocable post 22 which is slidable in a bench or table 23 disposed below the turret 16. Any suitable means (none shown) may be provided for imparting an intermittent reciprocatory motion to the post 22 in timed relation with the intermittent rotary motion of the turret, so that the mold 20 is elevated into engagement with each stem tube while it dwells momentarily at the molding station.

As shown more clearly in Figs. 3 and 4, the mold is pivotally supported within a cavity 24 in the upper end of the reciprocatory post 22. The cavity 24 is of somewhat larger cross-section than the mold, so that the mold is capable of a limited amount of lateral or radial movement relative to the supporting post. A semi-spherical depression 25 in the bottom of the cavity 24 is adapted to loosely accommodate a reduced round ended extension 26 on the bottom of the mold. The body of the mold has a horizontally extending bore 27 adapted to loosely accommodate a horizontal pin 28 which is attached at both ends to the post 22.

The mold is provided with an annular depression or cavity 29 adapted to receive the softened lower end of each stem tube and form thereon the external annular flange 12. The mold is further provided with an upstanding centering pin 30 which is concentric with the mold cavity and is adapted to enter the lower end of the stem tube. This centering pin is preferably of sufficient length to extend into the unsoftened portion of each stem tube, whereby the mold is, in effect, self-centered with respect to each stem tube. The loose pivotal mounting of the mold in its supporting post allows sufficient movement of the mold to compensate for slight variations in the positions assumed by the lower ends of the various stem tubes at the molding station, which variations may be due to slightly bent stem tubes or slight misalignment between the various chucks and the mold.

In the operation of the machine, the turret is intermittently rotated so that each stem tube is indexed through the several heating stations and then to the flange molding station. While dwelling momentarily at the molding station, the softened lower end of each stem tube is engaged by the mold, which is elevated in timed relation with the intermittent motion of the turret. The centering pin 30 enters the lower end of each stem tube and thereby centers the mold with respect to each stem tube, so that the softened lower end of each stem tube is engaged by the mold cavity 29 which forms the external flange 12 on the end of each tube.

It is to be understood that the invention is not limited to the particular embodiments thereof herein illustrated and described, except insofar as is defined by the appended claims.

What is claimed is:

1. In a machine for making filament supporting stems for electric lamps, a carrier supporting a series of holders, each adapted to hold a stem tube, said carrier being intermittently movable to advance said holders, one at a time, to a stem shaping station, means at said station for shaping each stem tube, a support loosely mounting said shaping means, and means on said shaping means adapted to enter each stem tube to properly position said shaping means with respect to each stem tube.

2. In a machine for making filament supporting stems for electric lamps, a carrier supporting a series of chucks, each adapted to hold a stem tube, said carrier being intermittently movable to advance said chucks, one at a time, to a molding station, and a movable mold at said station having an annular mold cavity for molding a flange at an end of each stem tube, said mold having a centering pin adapted to enter each stem tube to center the mold cavity with respect to each stem tube.

3. In a machine for making filament supporting stems for electric lamps, a carrier having an annular series of chucks, each adapted to hold a stem tube, said carrier being rotatable about a central axis to advance said chucks, one at a time, to a molding station, means at said station for shaping each stem tube, a carrier movably supporting said shaping means, and a centering pin on said shaping means adapted to enter each stem tube, whereby said shaping means is automatically centered with respect to each stem tube.

4. In a glass working machine, means for holding a glass tube, means for softening an end portion of the tube, a mold support mounted for movement relative to said holding means, a mold mounted for universal movement on said support for engaging and shaping the softened end portion of the tube, and a centering pin on said mold adapted to enter the said end of the tube for centering the mold with respect to the tube.

5. In a machine for making filament supporting stems for electric lamps, means for holding a stem tube, a mold supporting member, and a mold mounted for universal movement on said supporting member, said mold having an annular cavity for telescopic engagement with an end of the stem tube to form a flange thereon, and a centering pin on the mold concentric with the cavity and adapted to enter the said end of the tube for centering the mold cavity with respect to the tube.

6. In a glass working machine, a carrier comprising a series of holders, each adapted to hold a glass blank, said carrier being movable to advance said holders, one at a time, to a glass shaping station, a support at said station, means mounted for universal movement on the support for engaging and shaping the blanks, and centering means on said shaping means adapted to engage the blanks to properly position the shaping means with respect to each blank.

WILLIAM B. WINES.